Nov. 6, 1962 A. J. PIEL 3,062,187
LIQUID APPLICATOR FOR ANIMAL USAGE
Filed Oct. 24, 1960
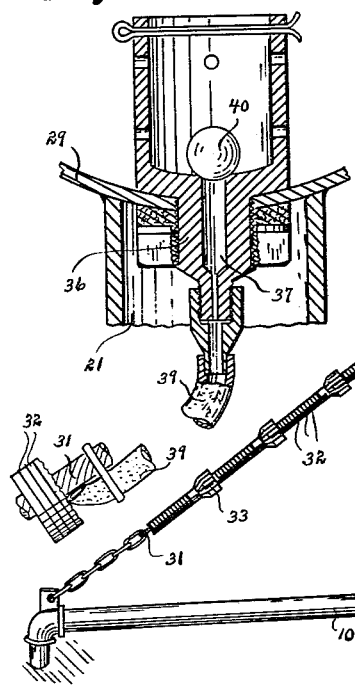
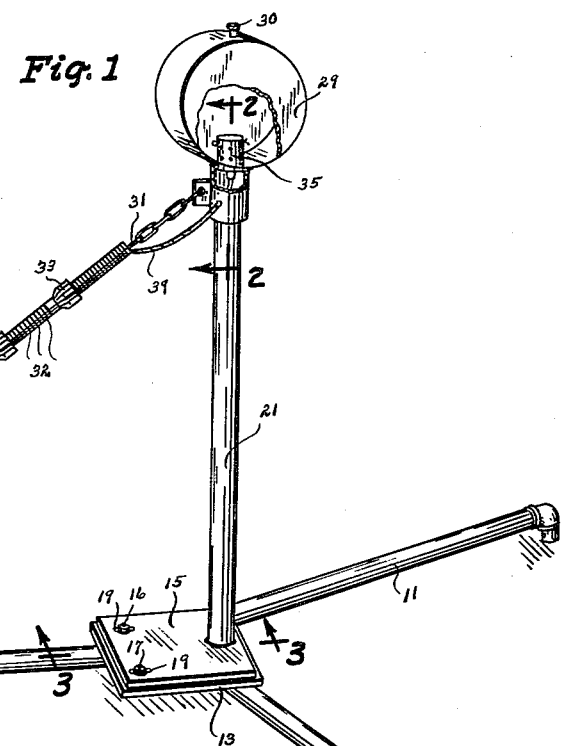
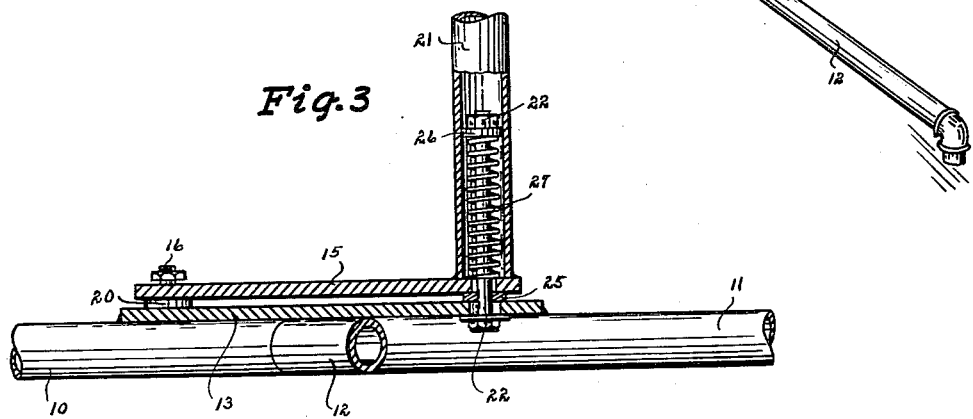
INVENTOR
ALFRED J. PIEL
BY
Talbert Dick & Harley
ATTORNEYS
WITNESS
FRED BAUGUS though inclined angle from the horizontal base of the device, liquid in the tank will gravity feed downwardly through the flexible conduit into the upper end area of the cable and saturate the upper end area of the cable only. Normally the ball valve 40 rests on the downwardly sloping bottom of the cage 35 and closes the upper end of the passageway 37. Some liquid will escape around the ball valve 40 and will drop into the upper end of the conduit 39 and onto the upper end of the cable 31 when the animal is not using the device. When the animal rubs against the cable, it will move the cable rapidly up and down, and to some extent rotate it. This movement will be transmitted to the tank 29 and cause the ball valve 40 to be shaken and moved around in the cage 35, and thereby permit substantial quantities of liquid in the tank to pass downwardly through the passageway 37, into the conduit 39, and into the upper end area of the cable 31. Obviously the liquid absorbed by the cable will move by capillary attraction downwardly along the cable to keep the entire cable in saturated condition. However, the chief point of contact by the animal with the cable will be the upper end portion of the cable and the supply of liquid thereto through gravity operation of the ball valve will take care of the average loss of solution from the cable to the animal.

Some changes may be made in the construction and arrangement of my Liquid Applicator for Animal Usage without departing from the real spirit and purpose of my invention, and it is my intention to cover by my claims, any modified forms of structure or use of mechanical equivalents which may be reasonably included within their scope.

I claim:

1. In a device of the class described, a liquid supply tank, an elongated cable extending at an angle upwardly from the ground to said tank, means securing the lower end of said cable to the ground, a ball valve cage secured to the bottom of said tank and communicating with the interior thereof, said ball cage having a restricted outlet passageway extending downwardly therefrom, with its upper end disposed adjacent the bottom of said ball valve cage, a ball valve in said cage normally resting on the bottom of the cage and closing the upper end of said passageway, said bottom of said cage sloping downwardly and inwardly to the upper end of said passageway, a flexible conduit connected at its upper end to the lower end of said passageway and extending downwardly therefrom, and means connecting the lower end of said conduit to the upper end of said cable.

2. The structure of claim 1 wherein said tank is supported on the upper end of a tubular post having its lower end supported by and secured to a base means.

3. The structure of claim 2 wherein said base means comprises at least three spoke members extending radially outwardly from said tubular post and having their outer ends resting on the ground; and wherein the lower end of said cable is secured to the outer end of one of said spoke members.

References Cited in the file of this patent

UNITED STATES PATENTS

| 1,605,147 | Johnson | Nov. 2, 1926 |
| 2,619,070 | Rockwood | Nov. 25, 1952 |
| 2,646,022 | Swanson | July 21, 1953 |
| 2,659,338 | Harris | Nov. 17, 1953 |
| 2,775,224 | Morrison | Dec. 25, 1956 |
| 2,807,240 | Vineyard | Sept. 24, 1957 |
| 2,813,510 | Piel | Nov. 19, 1957 |
| 2,823,646 | Edwards | Feb. 18, 1958 |
| 2,895,453 | Kartheiser | July 21, 1959 |
| 2,931,337 | Pfister et al. | Apr. 5, 1960 | angle it can be contacted by all sizes of animals. When an animal does contact and rub on the cable it is automatically pulled in a direction away from the supply tank. The supply tank, however, is operatively secured to the upper end of the cable, and this means that the pulling action of the cable will move the upper end of the tubular post accordingly. This is made possible by the spring loaded hinged plate 15 on the lower end of the tubular post. The movement of the post will however be against the yielding force of the coil spring. With the tubular post moved to a position not truly vertical, the ball valve will roll by the force of gravity to the side of the open top of the passageway 37, thereby permitting some liquid to pass from the tank, through the passageway 37, through the flexible conduit, and onto the cable. When the cable ceases to be under pressure from the animal, the coil spring will return the tubular post to a true vertical position, and the ball valve will roll to the dead center bottom of the cage thus closing the open top of the passageway 37. By this arrangement of parts, no pumping means is needed. The supplying of suitable liquid to the upper end of the cable is automatic and only when needed due to the fact that the animal itself in the use of the device, initiates the cable oiling. By the conduit 39 beeing flexible and loose, it is not damaged by the movement of the cable by the animal.

Some changes may be made in the construction and arrangement of my liquid applicator for animal usage without departing from the real spirit and purpose of my invention, and it is my intention to cover by my claims, any modified forms of structure or use of mechanical equivalents which may be reasonably included within their scope.

I claim:

1. A liquid rubbing applicator for animal usage comprising:
    (a) a base frame,
    (b) a vertical support,
    (c) offset hinge means connecting the base of said support with said base frame whereby said support is tiltable with respect to said base frame,
    (d) biasing means connected between said base frame and said vertical support for maintaining said support in an upright position,
    (e) fluid reservoir means carried on said support in spaced relation to the base thereof;
    (f) a ball valve means communicating with said reservoir means, said ball valve means having a downwardly extending outlet passageway and a movable ball valve member normally closing said passageway under the action of gravity;
    (g) and an elongated animal applicator means extending between said base frame and said vertical support, said animal applicator means communicating with said outlet passageway,
whereby when an animal engages said applicator means, said support is tilted, said ball moves out of closing relationship with said passageway, and said reservoir communicates through said valve means with said applicator until said biasing means restores said support to upright position.

2. A liquid rubbing applicator for animal usage comprising:
    (a) a base frame,
    (b) a vertical support,
    (c) offset hinge means connecting the base of said support with said base frame whereby said support is tiltable with respect to said base frame,
    (d) biasing means connected between said base frame and said vertical support for maintaining said support in an upright position,
    (e) fluid reservoir means carried on said support in spaced relation to the base thereof,
    (f) valve means communicating with said reservoir means, said valve means having a downwardly extending outlet passageway and a movable valve member normally closing said passageway under the action of gravity,
    (g) and an elongated animal applicator means extending between said base frame and said vertical support, said animal applicator means communicating with said outlet passageway,
whereby when an animal engages said applicator means, said support is tilted, said valve member moves out of closing relationship with said passageway, and said reservoir communicates through said valve means with said applicator until said biasing means restores said support to upright position.

3. A liquid rubbing applicator for animal usage comprising:
    (a) a base frame,
    (b) a vertical support,
    (c) offset hinge means connecting the base of said support with said base frame whereby said support is tiltable with respect to said base frame,
    (d) biasing means connected between said base frame and said vertical support for maintaining said support in an upright position,
    (e) fluid reservoir means carried on said support in spaced relation to the base thereof,
    (f) an elongated animal applicator means extended between said base frame and said vertical support; and
    (g) valve means communicating with said reservoir means and with said applicator means, said valve means normally closed when said support is vertical, and open when said support is tilted to communicate said applicator means directly with said reservoir means.

References Cited in the file of this patent

UNITED STATES PATENTS

| | | |
|---|---|---|
| 2,581,028 | Kirk | Jan. 1, 1952 |
| 2,813,510 | Piel | Nov. 19, 1957 |
| 2,888,906 | Delp | June 2, 1959 |
| 2,945,474 | McIntyre | July 19, 1960 |
| 2,964,011 | Hall | Dec. 13, 1960 |
| 2,982,251 | Krogman | May 2, 1961 |